Inventor.
Charles Raymond Waseige
By A. E. Wilson
Attorney.

Fig. 16

Patented Feb. 28, 1939

2,148,972

UNITED STATES PATENT OFFICE 2,148,972

OPERATING MECHANISM FOR RETRACTABLE MEMBERS ON BOARD AIRCRAFT SUCH AS LANDING GEARS, CUPOLAS, TANKS, ETC.

Charles Raymond Waseige, Rueil, France, assignor to Air Equipment, Boulogne-Billancourt, Seine, France, a company of France Application February 16, 1937, Serial No. 126,082
In France February 18, 1936

20 Claims. (Cl. 244—102)

The present invention has for its object an operating mechanism for retractable members on board aircraft, such for example as landing gear, trailing wheels, turrets, tanks, cupolas etc.

The mechanism which is the object of the invention essentially comprises a movable driving device which is compelled to follow a definite path and which has a driving member proper and a speed reducer interposed between two members between which the power is applied, one of said members being coupled or fixed to a fixed part of the aircraft and the other being coupled or fixed to the member to be moved or even consisting of said member itself.

The mechanism thus formed has the great advantage of having a very great flexibility of adaptation on an aircraft which is already constructed or which is being designed.

Such a mechanism is capable of very varied embodiments. In one group of embodiments the movable driving device is arranged at one of the summits of a polygonal line forming the contour of a deformable system materialized by bars arranged along said contour, the driving device being coupled between the two bars which end at said summit. The deformability of the system at each of the summits can be obtained by simple articulations, slides or a combination of the two.

For the sole purpose of facilitating the comprehension of the invention, there have been shown in the accompanying drawings, but solely by way of indicative and non limitative examples a few examples of embodiment which furthermore offer other peculiarities forming as many detail objects of the invention.

Figures 1, 2, 3, 4, 5, 6:
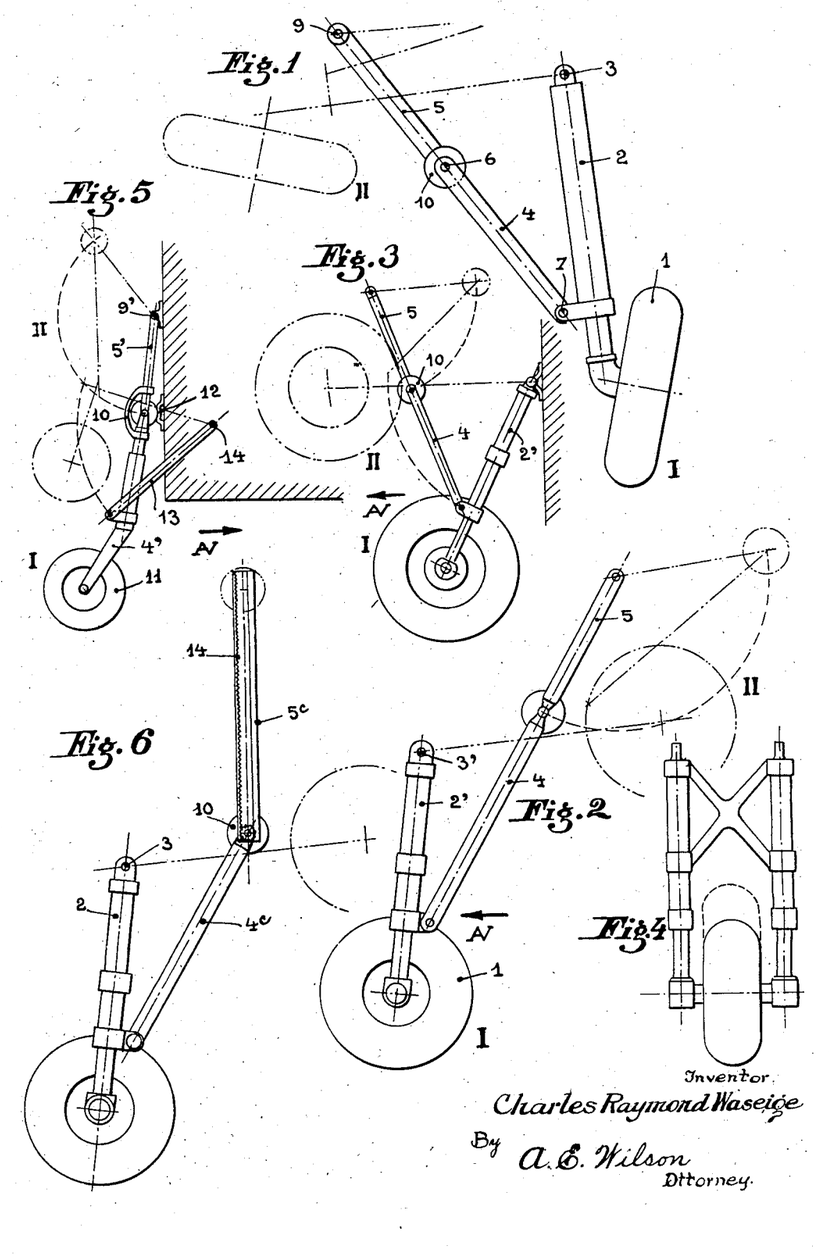
Figs. 1 to 6 show diagrammatically the application of various modifications of the mechanism which is the object of the invention to different systems of raising the landing gears of aeroplanes, Fig. 5 showing the mechanism applied to a trailing wheel.

In the example of Fig. 1 the landing gear lifting system is of the lateral type, that is to say that the wheel 1 is carried by one end of a shock absorber 2 of which the other end is hinged on a pin 3 directed substantially from the front towards the rear. Two bars 4 and 5 which are hinged to each other at 6 form a sort of compass of which the arm 4 is hinged at 7 on a fixed point of the shock absorber 2 and the arm 5 on a fixed point 9 of the framework of the aeroplane. 10 designates the driving device as a whole which is arranged at the hinge 6 and coupled between the two arms 4 and 5. It is obvious that when the compass 4—5 closes under the action of the device 10 to come into the position shown in dotted lines, the wheel 1 passes from the lowered position I to the raised position II. In this example the two members 4, 5 between which is coupled the driving device 10, are formed the one by the bar 4 which is coupled to the member to be moved 1, 2 and the other by the bar 5 which is coupled to a fixed part of the aircraft. The members 4, 5 and 9 form a deformable system of polygonal contour materialized by bars which are articulated at the summits of the polygonal line and which are all movable.

In the example of Fig. 2, the wheel 1 is raised by pivoting from the front to the rear about a pin 3′ which is transverse to the longitudinal axis of the aeroplane and it is carried by said pin through the instrumentality of a shock absorber fork 2′ (Fig. 4). The mechanism which is the object of the invention is the same as in the case of Fig. 1, but the compass 4—5 is arranged behind the fork 2′ and the whole arrangement operates in the same manner to cause the wheel 1 to pass from the position I to the position II.

In Fig. 3 the lifting system of the wheel 1 is of the same type as in Fig. 2, but the wheel is lifted by pivoting from back to front and the compass 4, 5 is arranged in front of the fork 2′.

Fig. 5 shows the application of the mechanism which is the object of the invention to a trailing wheel 11 carried by a fork 4' which is hinged on a bar 5' of which the other end is hinged at 9' on a fixed point of the aeroplane. The driving device 10 is arranged at the hinge connection between the two bars 4' and 5' and bears on a cradle 12 when the wheel is lowered to the landing position I. A supplementary bar 13 which is hinged on the fork 4' and on another fixed point 14 of the aeroplane, completes the definition of the mechanism and compels the wheel 11 to follow a definite path. The operation is the same as in the previous cases and the wheel is displaced almost vertically to come into the position II.

In this example the bars 4', 5' and 13 form a deformable system of polygonal contour having bars which are articulated at the different summits and which are all movable but one of the two members 4', 5' between which is interposed the driving device 10, is in this case formed by the member to the moved 4' itself.

Fig. 6 shows another example of mechanism according to the invention applied to the raising of a landing wheel arranged like that of Fig. 2. The driving device 10 is in this case interposed between the end of a bar 4c of which the other end is hinged on the wheel carrier fork 2 and a bar 5c fixed on the aircraft, said bar carrying a rack 14 engaged by the speed reducer of the driving device 10. The latter therefore moves along the rack which determines its path. In this case again, the members 4c, 5c and 2 form a deformable system determining a polygonal line, but in this case the deformation of the system is obtained at the summit on which it located the driving device 10 by the sliding and pivoting of one of the two members between which the driving device 10 is interposed, viz. the movable bar 4c, on the other of said two members which is fixed, in particular the bar 5c.

Figures 7, 8, 9:
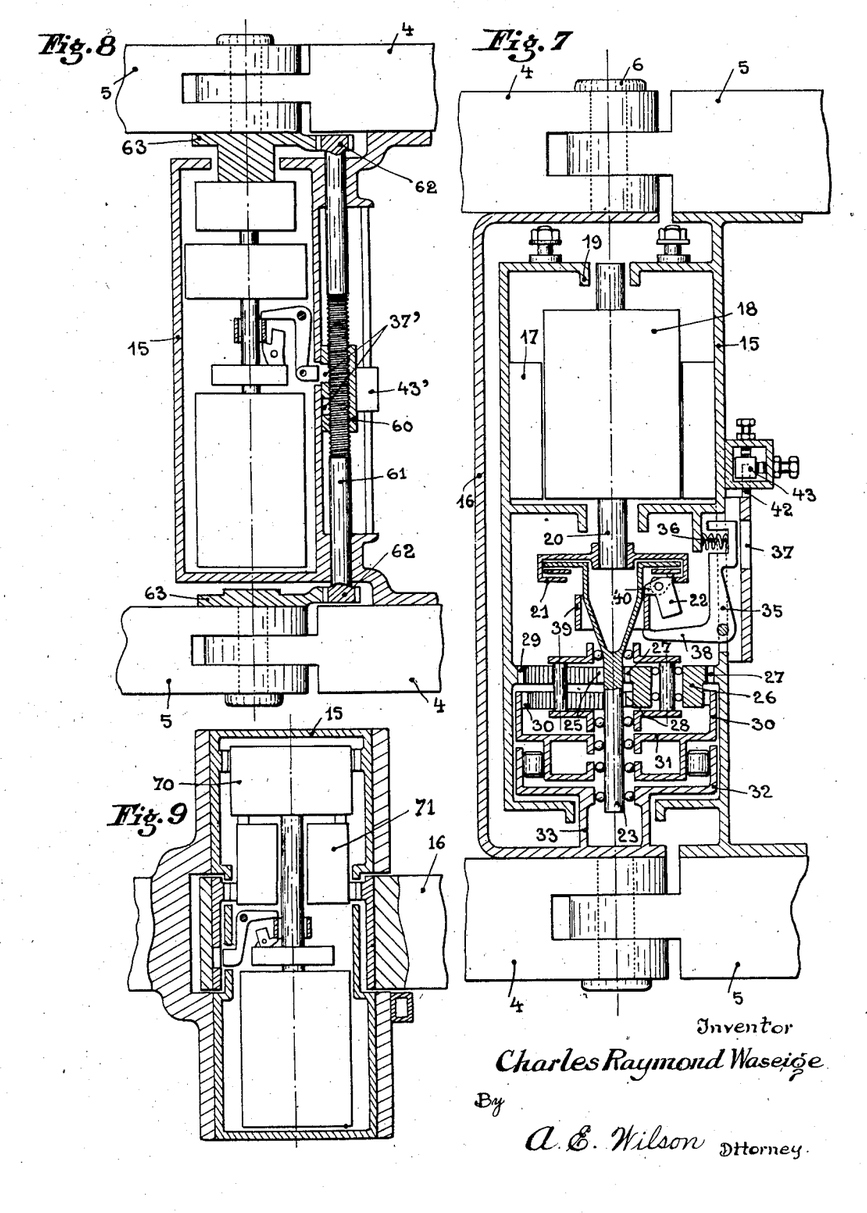
Fig. 7 is a diagrammatic section of a particular embodiment of the driving articulation in the case of a deformable system constituted by a compass, said section being taken through the axis of articulation.
Figs. 8 and 9 are similar sections to that of Fig. 7 but show modifications of construction.

In the example of driving articulation shown in Fig. 7, a substantially cylindrical housing 15 placed between the two arms 5 of a double compass is fixed to said two arms; another housing 16 partially surrounds the housing 15 and is fixed to the two other arms 4 of the compass. The inside of the housing 15 carries the stator 17 of an electric motor of which the rotor 18 is arranged along the hinge pin 6 of the compass and is journalled in bearings 19 of said housing. At the end of the shaft 20 of the rotor 18 is keyed a torque limiting clutch 21 operating by friction and by means of centrifugal weights 22 carried by the driving member, whereas the driven member is fixed on a shaft 23 which is co-axial with the rotor. Said shaft 23 engages a reducer of the epicycloidal type comprising a pinion 25 keyed on the spindle 23 and meshing with peripherally spaced planet members 26, each planet member consisting of a pinion having two toothings 27, 28 which roll respectively on a toothing 29 fixed to the housing 16 and on a ring gear 30 rotating with the driving member 31, free on the spindle 23 of a free wheel of which the driven member 32 rotates in unison with the housing 16 to which it is attached by a sleeve 33 projecting from the housing 15.

On the other hand, rocking latches 35 are carried by the housing 15 and cooperate with suitable keepers carried by the housing 16. Said latches 35 are urged towards their locked position by springs 36. Preferably the housing 15 carries pairs of keepers 37 spaced apart the angle of opening of the compass so that the same latches find keepers opposite them when the compass is completely open and when it is closed.

Each latch 35, Figure 7, furthermore carries an appendix 38 which extends inside the housing 15 and terminates adjacent the spindle 23 so that it is in the path of a sliding sleeve 39, which fingers 40 carried by the weights 22 push back axially when said weights move outwardly responsive to centrifugal force, the displacement of the sleeve causing the latches 35 to rock against the action of the springs 36 and to become disengaged from the keepers 37.

It is obvious that when the latches 35 are engaged in keepers 37 the two housings 15 and 16 are held stationary relatively to each other, thereby locking the hinge and the compass in its open or closed position. If the electric motor 17, 18 is started up, the weights 22 begin to move apart as soon as the first revolutions of the motor occur and cause the unlocking in the above described manner. Said weights are constructed so that said unlocking is effected before they begin to bear sufficiently on the torque limiter clutch to cause the shaft 23 to be driven. After the unlocking is effected and as the weights continue to move apart responsive to the increase of speed of the motor, the shaft 23 is driven and a relative angular displacement of the housings 15 and 16 occurs and consequently of the arms 4 and 5 of the compass to which said housings are respectively fixed. At the end of the stroke, a finger 42 carried by the housing 16 actuates a switch 43 controlling the motor and cuts off the current. As the motor stops, the weights 22 move towards the centre and enable the latches 35 to rock under the action of the springs 36 to penetrate into the keepers 37 located opposite them and to lock the compass in the new position which it has taken up.

The presence of a centrifugal coupling which is totally disengaged when inoperative also has the advantage of enabling the motor to start on no load, thereby eliminating the very high current peak at the instant of starting with rapid electric motors, said peak being particularly disadvantageous on an aeroplane in which the batteries are of low capacity.

At the time the driven shaft 23 is driven, the rotor of the electric motor has moreover acquired an appreciable momentum which helps to facilitate the driving of said shaft.

It will be seen that the above described hinge only exerts driving power in a single direction; in the opposite direction the rotation of the motor does not have any other effect than to produce the unlocking, and the variation of the angle of the compass is effected under the action of any other outside force. Said outside force is in general produced by an elastic cord which it is known to arrange so that its action is at a maximum when the landing gear or other member to be operated is in the low position and at a minimum when said member is in the high position. In this case it is advantageous to provide a braking device for the lowering, preferably a hydraulic dashpot established so that at the beginning of the lowering said braking is weak, to increase subsequently and fall again to a very low value at the end of the lowering so as to enable the locking to be effected. The device for storing energy during the raising can be arranged on the hinge itself.

Of course a motor operating in two directions can be used without interposing a free wheel, the hinge in that case exerting drive in both directions.

It is advantageous to also provide a disengageable coupling between the driven member of the reducing gear and the corresponding arm of the compass so as to permit of the operation of the hinge by auxiliary means in spite of the irreversibility of the reducing gear.

In the case of a motor operating in two directions the presence of a free wheel is likewise desirable in order to permit of a relative angular displacement of the two housings 15 and 16 at a higher speed than the speed of the electric motor would permit; it is in that case necessary for there to be a locking device for the free wheel so that the hinge can exert drive in both directions.

Figure 10:
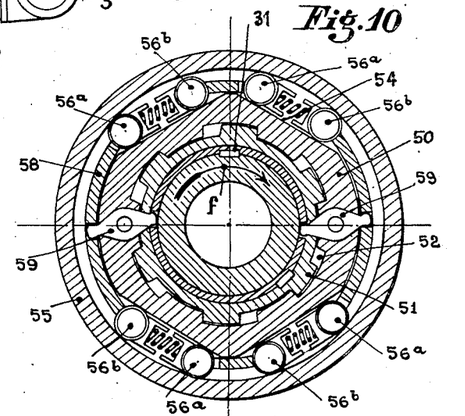
Fig. 10 shows in section a detail of an articulation which exerts drive in both directions of rotation.

It is particularly advantageous to arrange two free wheels adapted to act in opposite directions and associated with a device capable of locking one or the other of the free wheels at the same time as it releases the other. Fig. 10 shows an example of such a mechanism. In this example the driving member 31 is surrounded by a collar 50 with which it engages by means of ribs 51 engaged in grooves of greater width 52 of the collar 50, so that the two parts 31 and 50 can undergo a relative angular displacement with respect to each other. The collar 50 has on the outside flat portions 54 and in the space between each flat and an outer crown 55 are lodged two balls 56ª and 56ᵇ held apart by a spring 57 and retained in a cage 58 with a slight circular play. Pawls 59 which are pivoted on the collar 50 have one end engaged in recesses of the cage 58 and the other end in recesses of the part 31. It is obvious that as the part 31 rotates in the direction $f$ and consequently tends to drive the collar 50 in the same direction, the pawls 59 tend to remain in the position which they have in Fig. 10, tending to rotate the cage 58 in the opposite direction to $f$ and to jam the balls 56ª between the outer crown 55 and the flats 54, thereby causing the crown 55 to be driven in the direction $f$ when the part 31 rotates in the opposite direction to $f$, the angular displacement of the ribs 51 in the grooves 52 causes the pawls 59 to pivot and consequently the cage 58 to be displaced, thereby tending to lock the balls 56ᵇ and to drive the crown 55 in the opposite direction to $f$. On the other hand when the crown 55 is the driving member it can rotate as a free wheel in either direction as soon as its angular speed tends to be greater than that of the member 31, without the balls 56ª and 56ᵇ tending to jam.

In the modification of Fig. 8, latch keepers 37' are provided in a slide 60 guided on the housing 15 and form a nut on an axially fixed screw 61 carried by the housing 15. Pinions 62 at the end of said screw mesh with toothed segments 63 fixed on bars 50. When the compass formed by the bars 4 and 5 opens or closes, the pinions 62 are rotated and the slide 60 is displaced axially to bring one or the other of the keepers 37' opposite the latch 35 so as to permit locking to be effected in two extreme positions of the compass. The slide 60 serves furthermore to actuate the end stroke switch 43'. There is no housing 16 in this case and the two arms 4 and 5 are caused to rotate in unison through the intermediary of the screw 61. In other respects the mechanism is the same as that of Fig. 7.

In the modification of Fig. 9 the reducing gear 70 is arranged right at the end of the housing 15 and the wheels 71 are placed in the space between the reducing gear and the motor so as to engage the housing 16 towards the middle of the latter which only exists around the medial portion of the housing 15, the hinging of the two bars 4 and 5 to each other being only effected in this case by the centering of the housing 15 on an appropriate part of the housing 16.

Figure 11:
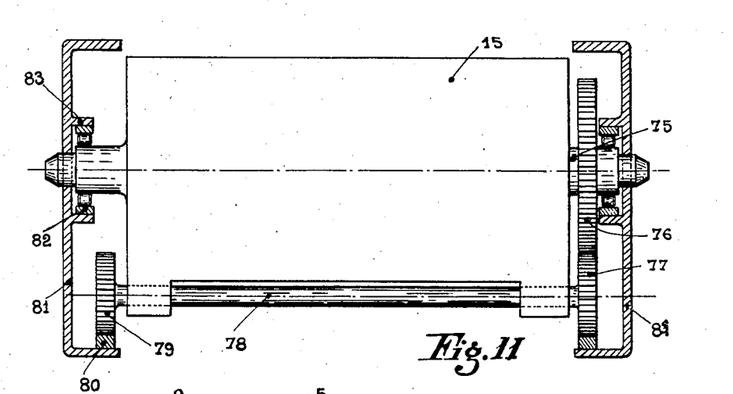
Fig. 11 shows diagrammatically another modification of the operating mechanism according to the invention.

Fig. 11 shows an example of construction of the embodiment shown diagrammatically in Fig. 6. The driving device enclosed in its housing 15 drives a shaft 75 which projects from the said housing and on which is keyed a wheel 76 meshing with a wheel 77 keyed on the end of a countershaft 78 parallel to the axis of the motor and carried on the outside by the housing 15. On the other end of the shaft 78 is keyed a wheel 79 which is identical with the wheel 77, and the wheels 77 and 79 mesh respectively with racks 80 fixed on two channel irons 81 which between them form the bar 5ᶜ of Fig. 6.

At the two ends of the housing 15 are furthermore fixed roller bearings 82 engaged in guides or races 83 carried by the channels 81. It will be realized that when the motor rotates the wheel 76, the driving device as a whole runs along the racks 80.

Figure 12:
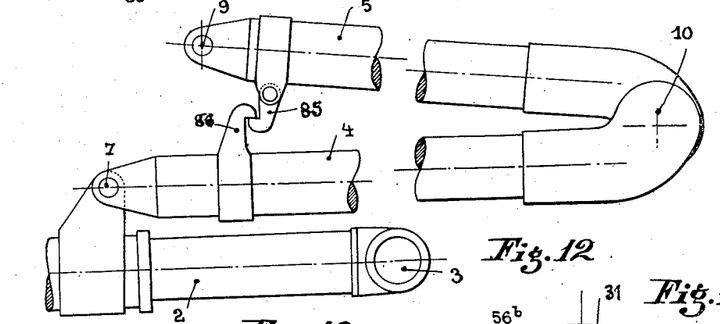
Fig. 12 is a diagrammatic view of a particular locking device.

As seen in Figs. 1, 2, 3 if the landing gear in the raised position is subjected to great forces of inertia, the locking arrangement of the hinge 10 is subjected to very great reactions. To avoid them it is advantageous to provide the locking in the raised position directly between the bars 4, 5 as shown in Fig. 12, for example by means of a hinged latch 85 fixed on a bar and engaging in a catch 86 fixed on the other bar. In this manner not only the hinge 10 is relieved, but the bars 4, 5 are no longer subjected to bending stresses in the raised position. The unlocking of the device shown in Fig. 12 can be controlled by the driving device or by an electro-magnet acting directly, or by an auxiliary mechanical control.

Figure 13:
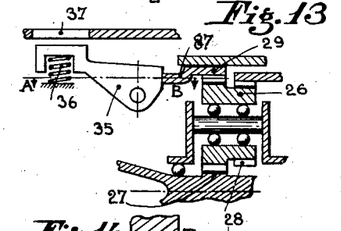
Fig. 13 shows diagrammatically a modification of the unlocking control and Fig. 14 is a section along the line AB.
Figure 14:
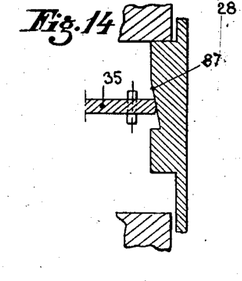

In this case, and in general when the automatic unlocking of the driving hinge is only provided for one direction of operation, a modification of the control device for the latches consists (Fig. 13) in making the crown 29 capable of an angular displacement which is limited between two stops, said angular displacement causing, through the instrumentality of a cam 87, the retraction of the latch 35, either by direct action or through the instrumentality of any appropriate transmission by cable, rods, countershafts, etc. in particular if the latch is remote (latch 85 Fig. 12).

Figure 15:
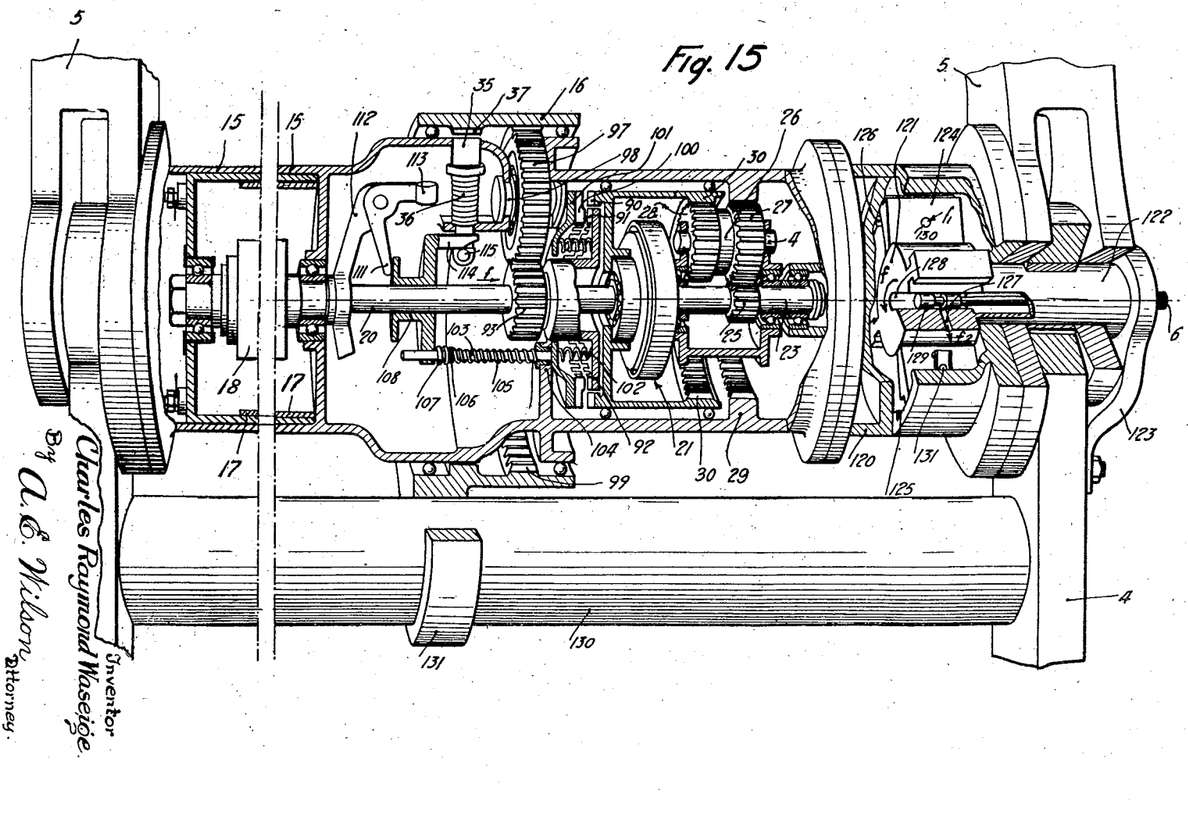
Fig. 15 is a perspective view of another construction of driving articulation with partial section, partly broken away.

In the example of construction of Fig. 15, the gear wheel 30 which is driven by the planet gears 26 of the reducing gear, carries a crown of dogs 90, and another crown of dogs 91 inside the crown 90 is carried by a plate 92 located at the end of a pinion 93 which is loosely mounted on the drive shaft 20. Said pinion 93 meshes with a gear wheel 97 carried by a shaft 98 fixed on the housing 15; the wheel 97 meshes with a ring of teeth 99 carried inside the housing 16. Opposite the dogs 90 and 91 is arranged another crown of dogs 100 carried by a plate 101 loosely mounted and sliding on the hub of the plate 92. Said dogs 100 are arranged so as to be able to be placed in engagement both with the dogs 90 and with the dogs 91, thereby causing the pinion 93 and the sun wheel 30 to rotate in unison. Between the plates 92 and 101 are interposed springs 102 which tend to move said two plates away from each other.

As long as the crown 100 is prevented by the springs 102 from engaging simultaneously with the crowns of dogs 90 and 91, it is possible to displace the housings 15 and 16 angularly in both directions relatively to each other about their common hinge 6, and consequently the bars 4 and 5 to which they are respectively fixed since, in this movement, the pinion 93 and the gear wheel 97 rotate loosely and the reducing gear as a whole remains stationary. On the contrary when the dogs 90, 91 are in engagement, the irreversibility of the reducing gear renders any angular displacement impossible otherwise than by the action of the drive shaft 20.

Push rods 103 formed by rods slidingly mounted in guides 104 carried by the housing 15 are arranged parallel with the axis of the housings 15 and 16 so as to enable them to push the plate 101 against the action of the springs 102 and of the springs 105 placed between the fixed guides 104 and a shoulder 106 on each push rod.

Other much stiffer springs 107 are interposed between the other face of said shoulder 106 and the collar of a sleeve 108 mounted on the shaft 20 and pushing said sleeve against rocking fingers 111 carried by a part 112 keyed on the drive shaft 20. The fingers 111 carry weights 113 arranged so that in moving away from the axis of rotation they cause the sleeve 108 to be pushed by the fingers 111 against the action of the springs 107 and thereby cause the push rods 103 to slide against the action of the springs 105. The sleeve 108 furthermore carries unlocking slopes 114 cooperating with rollers 115 of the latches 35 arranged radially in the housing 15 to engage in keepers 37 of the housing 16 and urged towards their locking position by springs 36.

When the shaft 20 is driven by the motor 18, the centrifugal clutch 22 first of all comes into action, the reducing gear 25—30 is driven and the crown of dogs 90 rotates loosely. At the same time the weights 113 move apart, the fingers 111 push the sleeve 108 in the direction f and, in this movement, the unlocking slopes 114 bring the latches 35 back towards the centre thereby enabling the housings 15 and 16 to rotate relatively to each other. Then, as the latches 35 are disengaged, the weights 111 continue to move apart carrying with them the sleeve 108 and displacing the push rods 103 through the instrumentality of springs 107, compressing the springs 105. The push rods 103 displace the plate 101, compressing the springs 102 and the dogs 100 engage in the dogs 90 and 91. The pinion 93 is then driven and rotates the housing 16 through the instrumentality of the gear wheels 97.

When the motor 18 stops, the weights 113 move towards the axis, the springs 102 push back the plate 101 whereas the push rods 103 are retracted in the opposite direction to f by springs 105 and carry with them the sleeve 108; the dogs 100 disengage from the dogs 90 and 91 thereby breaking the coupling between the pinion 93 and the reducing gear i. e. the transmission interposed between the housings 15 and 16. Then as the sleeve 108 continues to move backwards under the pressure of the springs 105, the unlocking slopes 114 release the latches 35 which the springs 36 push into the keepers 37 as soon as any of them comes into register with the latches. Said keepers are arranged so that there is only one position of locking of the lowered landing gear and that there is no locking of the gear when the latter is raised again; the lowering of the gear is therefore always possible even if the electric motor does not operate.

On the other hand, it will be seen that the actions of the latches 35 and of the plate 101 are strictly successive, and in both directions. There cannot therefore be any engagement of the crown 101 before the latches 35 have come out of the keepers, and conversely. Any risk of mistake in operation is thus eliminated.

The housing 15 is fixed by its end at the end of a cylinder 120 which is bolted on the arm 5 of the compass like hinge. Inside said cylinder can rotate a diametral paddle 121 of which the hub is extended outside the cylinder by a tail 122 which passes through the hinge 6 and on which is keyed a lever 123 of which the end is fixed on the bar 4. Inside the cylinder 120 is another paddle 124 which can only be displaced between two stops 125 and 126 formed by the edges of a recess of greater diameter of the cylinder 120. The paddle 124 extends to the bottom of said recess but it has on one of its faces a flange of the same diameter as the rest of the cylinder 120.

Radial holes 127 in the hub of the paddle 121 place each of the four compartments between said paddles 121 and 124 in communication with a central bore 128 of the tail 122 and a piston valve 129 screwed in said bore enables the cross section of the passage through said holes to be adjusted. Said piston valve 129 is constructed so as to allow the two compartments located on the same side of the paddle 124 to communicate with each other; holes 130 through said paddle and valves 131 permit of a direct communication between the two compartments located on the same side of the paddle 121, but only in the direction of the arrow f1.

When the housings 15 and 16 rotate relatively to each other carrying with them the bars 4 and 5, the paddle 121 and the cylinder 120 likewise rotate relatively to each other and the paddle 124 follows this movement until it is stopped by one of the stops 125 and 126 according to the direction of movement.

As long as the paddle 124 rotates, no braking takes place whatever be the direction of the paddle 121; when such direction is that of the arrow f and the paddle 124 is held stationary by the stop 125 which prevents it from rotating further in the direction of f, the liquid which is compressed by the front face of the paddle 121 lifts the valve 131 and escapes through the hole 130 in the direction f1; there is therefore as yet no braking; it is only when the direction of rotation of the paddle 121 is in the opposite direction to f and the paddle 124 is held stationary by the stop 126 that the liquid which is compressed by the front face of the paddle circulates in the direction of the arrow f2 in the radial holes 127 and brakes the relative displacement of the cylinder 120 and of the paddle 121. Towards the end of its stroke the paddle 121 comes into register with the part of the cylinder of greatest diameter, thereby stopping the braking. On the other hand at the instant when the paddle 121 approaches the stop 126, the flange provided on the face of said paddle forms with the adjacent stop a substantially closed chamber so that the liquid which is therein damps the impact of the paddle on the stop.

It will therefore be seen that the closing movements of the compass which correspond to the lifting of the member to be retracted are not braked, whereas the reverse movements which correspond to the lowering are strongly braked save at the beginning and at the end.

Figure 16:
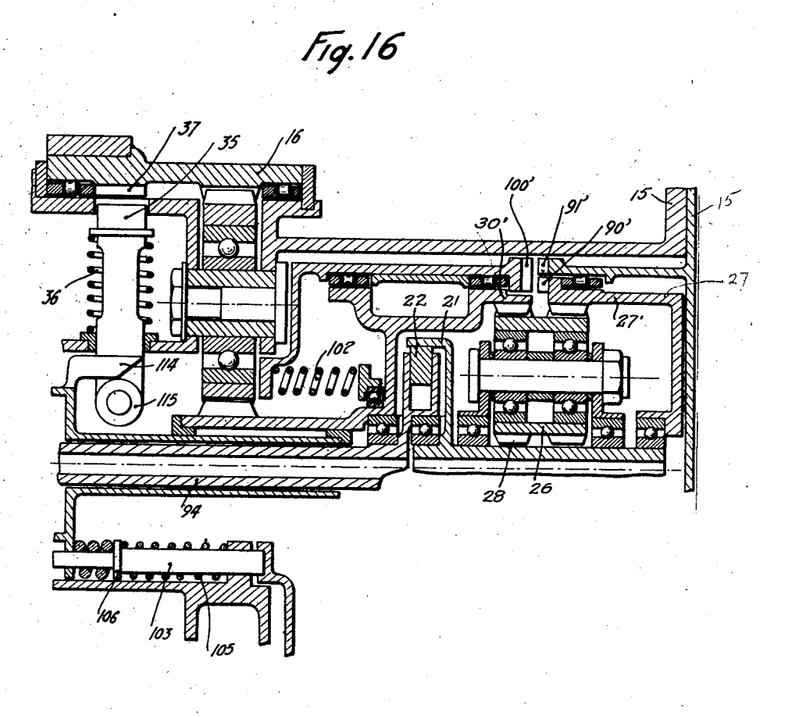
Fig. 16 shows a section through the driving spindle of a modification of construction of Fig. 15.

In the modification of construction of Fig. 16, the sun wheel 27' of the reducing gear is loose and carries on its side a crown of dogs 90' inside another crown of dogs 91' fixed on the housing 15. Opposite said crowns 90' and 91' is another crown of dogs 100' which is mounted so as to slide axially. The dogs 100' are arranged to engage at the same time in the dogs 90' and 91', thereby uniting the wheel 27' and the fixed crown 91', i. e. holding said sun wheel 27' stationary. It is this crown of dogs 100' which in this case receives the action of the push rods 103 which are driven as in the construction of Fig. 15. On the other hand the pinion 93 is in this case constantly secured to the toothing 30' meshing with the toothing 28 of the planet wheels 26.

When the dogs 100' are not in engagement with the dogs 90' and 91' the housing 15 can rotate freely relatively to the housing 16, the crown 90' rotating loosely. When said dogs are in engagement, there can only be a relative displacement of the housings 15 and 16 through the action of the motor 18, owing to the irreversibility of the sun wheel reducing gear.

In these two examples of construction, each arm 4, 5 of the compass is double, i. e. each is composed of two parallel arms connected to each other by a tubular cross member 130 crimped for example in said arms and it is said tube 130 which angularly ties the housing 16 to the arm 4 passing through an eye 131 of said housing 16.

Figure 17:
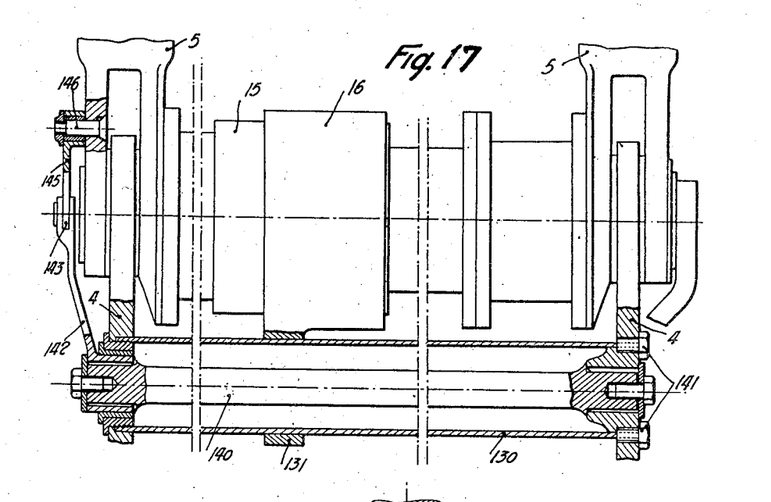
Fig. 17 is a partial view of the mechanism of Fig. 15 and shows a torsion bar device.
Figure 18:
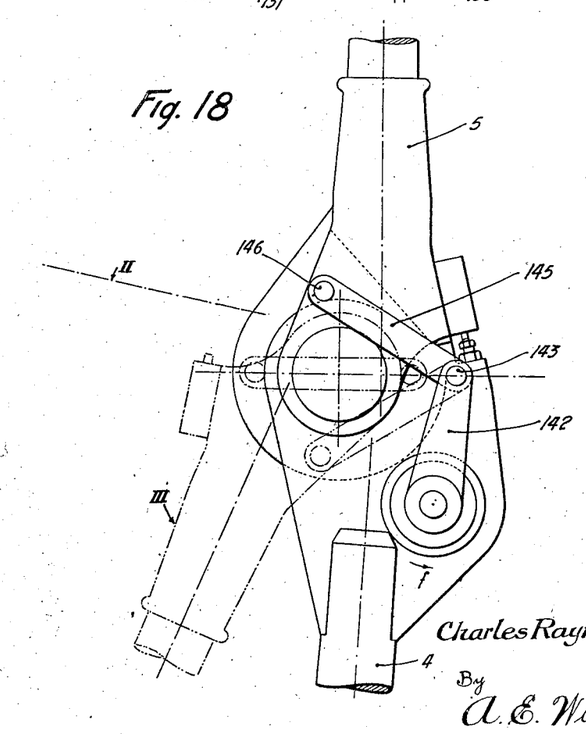
Fig. 18 is a corresponding side elevation.

In Figs. 17 and 18 the inner mechanism of the hinge which is that of Fig. 15 has not been shown and only the energy storing device has been illustrated. The latter consists of a bar 140 lodged inside the tubular cross member 130 of the arm 4 and of which one end is fixed to one of the limbs of said arm 4, for example by screws 141 engaging in longitudinal slots of the member 130. On the opposite end of which passes through the other limb, is fixed preferably by means of splines, a crank 142 of which the crank pin 143 also forms the crank pin of another crank 145 pivoted on a pivot 146 fixed on the arm 5. The two arms 4, 5 of the compass and said two cranks 142, 145 as a whole, form an articulated quadrilateral of which the pivots are formed by the bar 140, the crank pin 143, the pivot 146 and the hinge O itself of the compass. When the compass 4, 5 opens or closes it consequently causes a rotation of the crank 142 about the spindle of the bar 140 and the latter is twisted. Starting from the position of complete opening of the compass shown in full lines in Fig. 18, the bar 140 is twisted in the direction f when the compass begins to close and it thus resiliently opposes such closing which corresponds to the beginning of the raising of the member to be operated. Then when the pivots 146 and 143 pass into a straight line (position II Fig. 18), the rotation of the crank 142 is reversed until the complete closing of the compass (position III). During this movement, which corresponds to the end of the raising, the bar restores the stored up energy and helps in the raising operation by relieving the motor of the hinge. During the opening of the compass, in other words during the lowering, the reverse takes place: from the position III to the position II the bar 140 acts as a resistance then it becomes a driving member from II to I, i. e. at the end of the lowering and compensates the decrease in action of the weight and the increase of the resistance of the air. It thus forms a safety member during the lowering.

The invention is of course not limited to the details of construction illustrated or described. Thus the latches can be controlled electro-magnetically, the motor can be driven by a fluid under pressure instead of being electric, etc.

What I claim is:

1. Operating mechanism for retractable projecting members on board aircrafts, comprising a movable driving unit including a motor and a speed reducer actuated thereby, tie means carried by said motor, further tie means connected to said speed reducer to be actuated thereby, both said tie means providing the one for connection of said unit to a stationary point, the other for connection of the unit to the retractable member to be operated, to thereby compel said unit to follow a predetermined path, and a clutch interposed between said speed reducer and the tie member to be actuated by said reducer.

2. Operating mechanism for retractable projecting members on board aircrafts, comprising a movable driving unit including a motor and a speed reducer actuated thereby, tie means carried by said motor, further tie means connected to said speed reducer to be actuated thereby, both said tie means providing the one for connection of said unit to a stationary point, the other for connection of the unit to the retractable member to be operated, to thereby compel said unit to follow a predetermined path, automatically operating latches carried by said movable unit, keepers adapted for engagement with said latches provided to thereby lock said mechanism in at least one predetermined position, a centrifugal clutch between the motor and the reducer and including flying weights, and means whereby said weights are adapted to unlock said latches before causing engagement of said clutch.

3. Operating mechanism for retractable projecting members on board aircrafts, comprising a movable driving unit including a motor and a speed reducer actuated thereby, tie means carried by said motor, further tie means connected to said speed reducer to be actuated thereby, both said tie means providing the one for connection of said unit to a stationary point, the other for connection of the unit to the retractable member to be operated, to thereby compel said unit to follow a predetermined path, and a free wheel between the speed reducer and the tie member driven thereby.

4. Operating mechanism for retractable projecting members on board aircrafts, comprising a movable driving unit including a motor and a speed reducer actuated thereby, tie means carried by said motor, further tie means connected to said speed reducer to be actuated thereby, both said tie means providing the one for connection of said unit to a stationary point, the other for connection of the unit to the retractable member to be operated, to thereby compel said unit to follow a predetermined path and means adapted to act as a free wheel device in both directions of rotation between the speed reducer and the tie member driven thereby.

5. Operating mechanism for retractable projecting members on board aircrafts, comprising a movable driving unit including a motor and a speed reducer actuated thereby, said speed reducer being of the planetary type and including a driving sun wheel and a driven sun wheel, means adapted to alternately lock against rotation and make loose said driven sun wheel, tie means carried by said motor, further tie means connected to said speed reducer to be actuated thereby, both said tie means providing the one for connection of said unit to a stationary point, the other for connection of the unit to the retractable member to be operated, to thereby compel said unit to follow a predetermined path.

6. Operating mechanism as in claim 5, further comprising means including flying members rotated from said motor and connected to said locking means to operate same in dependence on the motor speed.

7. Operating mechanism as in claim 5, further comprising latches carried by said movable unit, keepers adapted for engagement with said latches to thereby lock said mechanism in at least one predetermined position, means including flying members rotated from said motor and connected both to said latches and locking means so that centrifugal movement of said flying members will first operate the latches to unlock the mechanism and thereafter actuate said locking means to lock the driven sun wheel against rotation.

8. Operating mechanism for retractable projecting members on board aircrafts, a folding stay including two bars or tie members pivotally jointed together, driving means for folding said stay, a resilient bar parallel to the joint axis and secured to one tie member and a mechanism adapted to transform a continuous rotation into an alternative one connecting the opposite end of the resilient bar to the other tie member to thereby produce an alternative rotation of this bar end in response to a continuous relative angular motion of the tie members about the joint axis.

9. Operating mechanism for retractable projecting members on board aircrafts, comprising a folding stay including at least two bars pivotally jointed together, a gear wheel train including two end gear wheels both coaxial to the pivotal joint between said bars, one of said end wheels being rotatably carried by one of said bars and the other end wheel is so tied to one bar that both the wheel and bar will turn as a whole about the joint axis and a motor carried by a bar and so tied to the bar other than that tied to the end wheel that motor and bar will turn as a whole about the joint axis, said motor being connected to said rotatably carried end wheel to rotate the latter.

10. Operating mechanism as in claim 9 wherein said motor is also coaxial to the joint between the bars.

11. Operating mechanism as in claim 9 further comprising a speed reducer interposed between the motor and the said end wheel driven from the motor.

12. Operating mechanism for retractable projecting members on board aircrafts, comprising a motor, a practically irreversible speed reducer driven from the motor and adapted to actuate the retractable member, means adapted to suppress in at least one direction of rotation the irreversibility imparted to the retractable member by the speed reducer, and control means driven from the motor to operate said previous named means in dependence on the motor running so that the irreversibility is suppressed during the time the motor is stopped.

13. Operating mechanism for retractable projecting members on board aircrafts, comprising a motor, a practically irreversible speed reducer driven from the motor and adapted to actuate the retractable member, means adapted to suppress in at least one direction of rotation the irreversibility imparted to the retractable member by the speed reducer, and centrifugally actuating means driven from the motor to operate said previous named means in dependence on the motor running.

14. Operating mechanism as in claim 12, further comprising locking means of the retractable member in at least its service positions, said locking means being controlled also by said control means in such a way that said retractable member will be unlocked before the control means operate to lend irreversibility to the retractable member.

15. Operating mechanism as in claim 9, comprising a cylindrical housing carried coaxially to the joint by the bar which carries the motor, the latter being also coaxial to the joint, a shaft driven from the motor and extending axially within said housing, transmission means between said shaft and the end wheel adapted to rotate independently of the bar by which it is carried, said housing being provided with an aperture through which projects said gear wheel train, a casing centered on said housing, the other end wheel of said train being secured to said casing, and connecting means between said casing and the other bar to cause them to rotate as a whole.

16. Operating mechanism as in claim 9, comprising a cylindrical housing carried coaxially to the joint by the bar which carries the motor, the latter being also coaxial to the joint, a shaft driven from the motor and extending axially within said housing, transmission means between said shaft and the end wheel adapted to rotate independently of the bar by which it is carried, said housing being provided with an aperture through which projects said gear wheel train, a casing centered on said housing, the other end wheel of said train being secured to said casing, connecting means between said casing and the other bar to cause them to rotate as a whole, interlocking means between said housing and casing to lock them against relative rotation, and control means of said interlocking means.

17. Operating mechanism for retractable projecting members on board aircrafts, including two bars pivotally jointed together, driving means to angularly and relatively move said bars about their pivotal joint and a hydraulic shock-damper including a cylinder secured to one bar coaxially to said pivotal joint, and a movable member fitted within said cylinder to act therein as a piston and connected to the other bar to be moved within the cylinder in dependence on the relative angular displacement of the bars.

18. Operating mechanism as in claim 17, in which said movable member is a rotatable diametral paddle, a second rotatable diametral paddle pierced with holes, and two abutments provided in the cylinder on each side of said apertured paddle to engage and stop the latter in two predetermined positions.

19. Operating mechanism as in claim 12, further comprising a centrifugal friction clutch between the motor and the reducer.

20. Operating mechanism as in claim 9, wherein cooperating locking members are respectively carried by said bars for mutual grasping engagement in the retracted position.

CHARLES RAYMOND WASEIGE.